3,391,068
CHEMILUMINESCENCE
Michael McKay Rauhut, Norwalk, Conn., assignor to American Cyanamid Company, Stamford, Conn., a corporation of Maine
No Drawing. Filed July 13, 1964, Ser. No. 382,384
16 Claims. (Cl. 204—59)

The present invention relates to chemiluminescence. It has been found, pursuant to the instant discovery, that visible chemiluminescent emission may be generated by the reduction of an organic compound. For example, a cation radical of a fluorescent organic compound or a dication of a fluorescent organic compound capable of direct conversion to its corresponding organic fluorescent compound, by taking on at least one electron, is reduced with a sufficiently energetic reductant to produce said fluorescent compound in its singlet excited state and thus provide a visible chemiluminescent emission.

Pursuant to one embodiment of the instant invention, a $1 \times 10^{-2}$ molar solution of 9,10-dichloro-9,10-diphenyl-9,10-dihydroanthracene in anhydrous tetrahydrofuran (THF) is stirred under an inert atmosphere and treated with a solution of 0.1 molar sodium naphthalenide in tetrahydrofuran. A bright blue light is emitted.

The reaction is as follows:

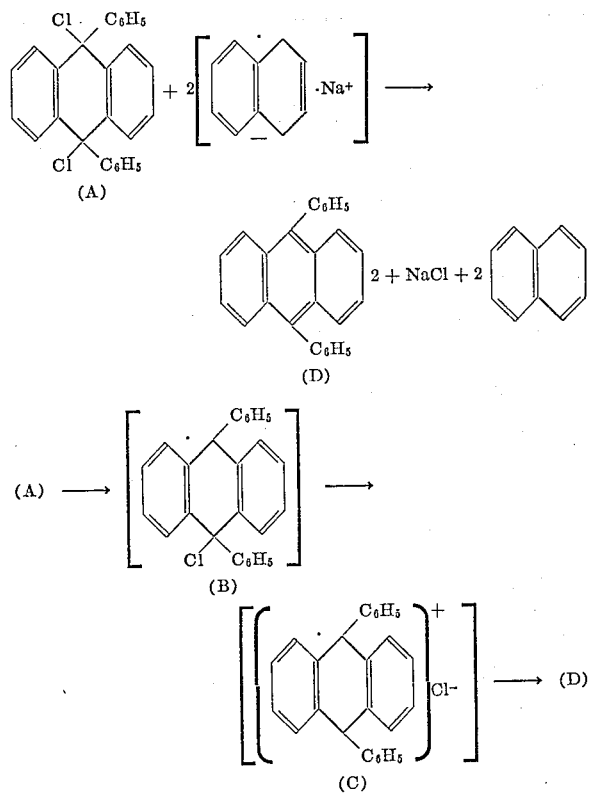

If desired, one may start with a (1) radical cation (C) prepared by removing one electron from (A), or a (2) dication (E)

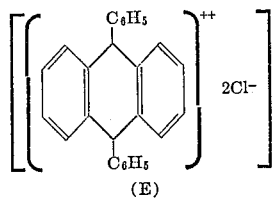

prepared by removing two electrons from (A).

As is obvious from the above, reactant (A) is the covalent compound corresponding to reactant (E); stated differently, (E) is the dissociated, diionized form of (A). In most solvents, such as tetrahydrofuran (THF), dimethylformamide (DMF), and the like, the reactant is in its covalent state (A); in certain solvents, however, such as $H_2SO_4$, and the like, the reactant apparently is dissociated into its diionized state (E).

As is evident from the above specific embodiment, even in solvents where the covalent structure of the reactant predominates, the reactant is effective in the process contemplated herein to produce light—just as though the reactant were completely ionized.

Generically, the process of the present invention may be described as follows:

$$[M]^{+(n)} \cdot Y^{e}(n) \text{ Light}$$

wherein $n$ is 1 or 2 and wherein M is the organic residue of an organic radical cation or dication and Y is selected from $Cl^-$, $2Cl^-$, $Br^-$, $2Br^-$, $I^-$, $2I^-$, $½SO_4^{--}$, $SO_4^{--}$, $BF_4^-$, $2BF_4^-$, $B(C_6H_5)_4^-$, $2B(C_6H_5)_4^-$, $OAc^-$, $2OAc^-$,

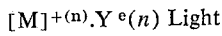

$SO_3C_6H_5^-$, $2SO_3C_6H_5^-$, $NO_3^-$, $2NO_3^-$, $ClO_4^-$, $2ClO_4^-$, $POCl_2^-$, $2POCl_2^-$,

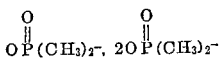

and the like. When $(n)$ is 1, Y is $Cl^-$, for example; when $(n)$ is 2, Y is $2Cl^-$.

$[M]^{+(n)} \cdot Y$, wherein $(n)$ is 2, likewise stands for the reactant compound in its non-ionized or covalent state, as shown in the specific embodiment equation in paragraph 2, above, of this specification. Therefore, by dication herein the corresponding covalent compound is also intended.

Numerous organic cation radicals and dications of the type described above are capable of direct conversion to their corresponding organic fluorescent compounds by taking on at least one electron. Typical of these are the cation radicals or dications of fluorescent aromatic polycyclic hydrocarbons, such as 1,4-dimethoxyanthracene, 1-methoxy-9,10-diphenylanthracene, 1,4-dimethoxy-9,10-diphenylanthracene, 2,3-benzofluoranthrene, anthracene, rubrene, pyrene, coronene, decacyclene, and the like.

Typical reductants within the purview of the instant invention and sufficiently energetic to provide an amount of energy at least equivalent to the amount of energy required to excite the aforementioned fluorescent compounds to their singlet excited state are Na, K, Li, sodium naphthalenide, sodium diphenyl radical anion, disodium 9,10-diphenylanthracenide, disodium stilbene, tetrabutylammonium naphthalenide, magnesium naphthalenide, and other organic radical anion reductants. As will be seen hereinafter, an electrolytic cathode may be used as reductant. The "energy of an excited state" is an easily measured experimental value. The energy difference between a first excited singlet and its corresponding ground state is defined by the frequency of the first absorption band in the ultraviolet or visible spectrum of the ground state species.

The physical energy released by a reaction is also an experimental quantity. The "free energy" of a reaction of the type given in the specific embodiment described above can be determined with considerable accuracy by polarographic measurements or by other procedures well known to the physical chemist.

Thus, the operable limits of cation radical chemiluminescence are capable of independent measurement and of clear definition in terms of physical characteristics of ion radicals, reductants, and fluorescent products. Consequently, generating chemiluminescent emission by reducing a cation radical or dication of the type contemplated herein with a reductant sufficiently energetic to provide an amount of energy required to produce the resulting organic fluorescent compound corresponding to the organic cation radical or dication in its singlet excited state can be accomplished by first recognizing the physical characteristics of the organic cation radical or dication, as well as the physical characteristics of the reductant to be used. If the reductant is sufficiently energetic and the total amount of energy (say, in kilocalories) resulting from the reaction with the cation radical or dication is enough to produce the corresponding organic fluorescent compound in its singlet excited state (defined above), visible light is produced.

The temperature at which the organic cation or dication radical is reduced is not critical, since very excellent results have been achieved at ambient temperatures. Preferably, also, the process of the present invention is carried out in an inert atmosphere, e.g., nitrogen, helium, or the like.

Obviously, the present invention has numerous applications. For example, chemiluminescence of the type realized herein may be used in safety equipment for recognition lighting, signaling, etc.

The present invention will best be understood by virtue of the following illustrative examples:

Example I

Ten milliliters of a $1 \times 10^{-2}$ molar solution of 9,10-dichloro-9,10-diphenyl-9,10-dihydroanthracene in anhydrous tetrahydrofuran is stirred at 28° C. and admixed therewith is 20 milliliters of a solution of 0.1 molar sodium naphthalide in tetrahydrofuran under an atmosphere of nitrogen. A bright blue light is emitted.

Example II

One hundred milliliters of a solution of $10^{-4}$ molar rubrene radical cation perchlorate (prepared by electrolytic oxidation of rubrene at a platinum anode at a potential of about +1 volt vs. the saturated calomel electrode) in dimethylformamide containing 0.1 molar tetrabutylammonium perchlorate is reduced at a platinum electrode at a potential of about −1.8 volts vs. the saturated calomel electrode. A bright yellow chemiluminescent emission is observed.

The following examples further illustrate the present invention, all of which are carried out at ambient temperature in the presence of an inert organic solvent, essentially as in Example I, supra:

| Example No. | Organic Cation or Dication (a) | Reductant (b) | Mole Ratio (a):(b) | Solvent |
|---|---|---|---|---|
| III | 9,10-dichloro-9,10-diphenyl-9,10-dihydroanthracene. | Sodium naphthalenide | 1:2 | THF. |
| IV | 9,10-dibromo-9,10-diphenyl-9,10-dihydroanthracene. | Sodium anthracenide | 1:1 | 1,2-dimethoxyethane. |
| V | 9,10-diacetoxy-9,10-diphenyl-9,10-dihydroanthracene. | Disodium stilbene | 2:1 | Dioxane. |
| VI | 9,10-dibenzoyloxy-9,10-diphenyl-9,10-dihydroanthracene. | Sodium stilbene radical anion | 1:2 | Diethylether. |
| VII | Rubrene radical cation perchlorate. | Tetrabutyl-ammonium anthracenide | 1:2 | DMF. |
| VIII | 9,10-dichlororubrene. | Potassium | 1:10 | Benzene. |
| IX | 9,10-dichloronaphthacene | Electrolytic cathode at −2 volts vs. saturated calomel electrode. | | Diethylether of diethylene glycol containing 0.1 molar tetrabutyl ammonium perchlorate. |
| X | Pyrene radical cation perchlorate. | do | | Do. |
| XI | Coronene radical cation perchlorate. | Sodium diphenyl | 1:10 | Do. |
| XII | Decacyclene radical cation perchlorate. | do | 1:5 | Do. |
| XIII | 1,4-dimethoxy-9,10-dichloro-9,10-dihydroanthracene. | do | 1:2 | 2-methylpyrolidinone. |
| XIV | 5-phenylchrysene radical cation perchlorate. | Electrolytic cathode at −2 volts vs. saturated calomel electrode. | | Diethylether of diethylene glycol containing 0.1 molar tetrabutyl ammonium perchlorate. |
| XV | 9,10-diphenylanthracene radical cation nitrate. | do | | 1,2-dimethoxyethane containing 0.1 molar tetrabutyl ammonium nitrate. |
| XVI | 9,10-diphenylanthracene radical cation para-toluene-sulfonate. | do | | 1,2-dimethoxyethane containing 0.1 molar tetrabutyl ammonium para-toluenesulfonate. |
| XVII | 9,10-diphenylanthracene radical cation tetrafluoroborate. | do | | 1,2-dimethoxyethane containing 0.1 molar tetraoctylphosphonium tetrafluoroborate. |
| XVIII | 1,2-benzanthracene radical cation perchlorate. | do | | Diethylether of diethylene glycol containing 0.1 molar tetrabutyl ammonium perchlorate. |

The reactions in the above table produce a visible chemiluminescent emission. While only several solvents are employed, it should be borne in mind that any suitable inert organic solvent may be employed. Typical solvents are 1,2-dimethoxyethane, tetrahydrofuran, dimethylformamide, dioxane, dimethylether of ethylene glycol, 2-methylpyrrolidinone, tetramethyl urea, triethyl phosphate, and the like. Obviously, numerous other suitable inert organic solvents and mixtures of any of these will be apparent to the skilled chemist.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

What is claimed is:

1. A method of generating a visible chemiluminescent emission which comprises reducing a reactant compound selected from the group consisting of a cation radical of a fluorescent organic compound and a dication of a fluorescent organic compound, said reactant compound being capable of direct conversion to its corresponding fluorescent organic compound by taking on at least one electron, said reduction being carried out with a sufficiently energetic reductant to produce the resulting fluorescent organic compound in its singlet excited state and thus provide a visible chemiluminescent emission.

2. The method of claim 1 wherein the reactant compound is the cation radical of a fluorescent aromatic polycyclic hydrocarbon.

3. The method of claim 1 wherein the reactant compound is the dication of a fluorescent aromatic polycyclic hydrocarbon.

4. The method of claim 1 wherein the reactant compound is 9,10-dichloro-9,10 - diphenyl - 9,10 - dihydroanthracene.

5. The method of claim 1 wherein the reactant compound is 9,10-dibromo-9,10-diphenyl-9,10-dihydroanthracene.

6. The method of claim 1 wherein the reactant is a rubrene radical cation.

7. The method of claim 1 wherein the reactant compound is 9,10-dichlororubrene.

8. The method of claim 1 wherein the reactant compound is a 1,2-benzanthracene radical cation.

9. The method of claim 1 wherein the reducing agent is an alkali metal.

10. The method of claim 1 wherein the reducing agent is a polycyclic aromatic radical anion.

11. The method of claim 1 wherein the reducing agent is sodium naphthalene radical anion.

12. The method of claim 1 wherein the reducing agent is sodium diphenyl radical anion.

13. The method of claim 1 wherein the reducing agent is disodium stilbene.

14. The method of claim 1 wherein the reactant compound is reduced at the cathode of an electrolytic cell through which electric current is passed.

15. The method of claim 2 wherein the reactant compound is reduced at the cathode of an electrolytic cell through which electric current is passed.

16. The method of claim 3 wherein the reactant compound is reduced at the cathode of an electrolytic cell through which electric current is passed.

References Cited

UNITED STATES PATENTS

| | | | |
|---|---|---|---|
| 2,420,286 | 5/1947 | Lacey et al. | 252—188.3 |
| 3,264,221 | 8/1966 | Winberg | 252—188.3 |

OTHER REFERENCES

Dement, J. H.: Fluorochemistry, Chemical Publishing Co., Inc., Brooklyn, N.Y., 1945, pp. 624–630, 252–301.2.

Kallman et al.: Change Injection into Organic Crystals: Influence of Electrodes on Dark & Photoconductivity, J. Chem. Phys., vol. 36, No. 9, May 1962, pp. 2486–2492, 313–108D.

JOHN H. MACK, *Primary Examiner.*

H. M. FLOURNOY, *Assistant Examiner.*